Oct. 8, 1940.   W. K. ROBBINS   2,216,831
CHAIN REPAIR LINK
Filed Nov. 3, 1939

Inventor:
William K. Robbins.
By: Brayton Richards
Attorney

Patented Oct. 8, 1940

2,216,831

UNITED STATES PATENT OFFICE 2,216,831

CHAIN REPAIR LINK

William K. Robbins, Chicago, Ill.

Application November 3, 1939, Serial No. 302,721

3 Claims. (Cl. 59—85)

The invention relates to improvements in chain repair links and has for its primary object the provision of an improved link of the character indicated, which is capable of economical construction and highly efficient in use.

Another object of the invention is the provision of an improved repair link of the character indicated, which is so constructed and arranged that it may be largely manufactured or produced by forging operations.

Other objects will appear hereinafter.

The invention consists of the combinations and arrangements of parts hereinafter described and claimed.

Figure 1:
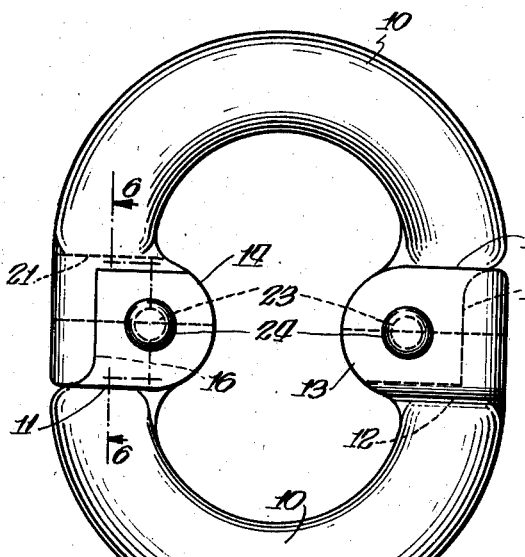
Figures 3, 4:
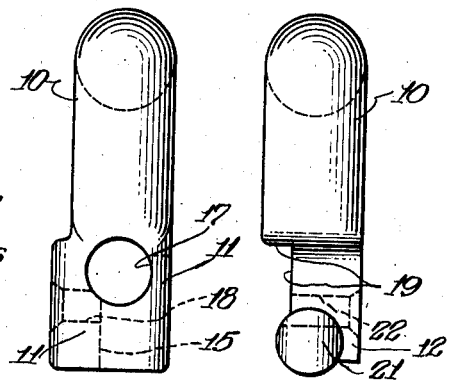
Figure 5:
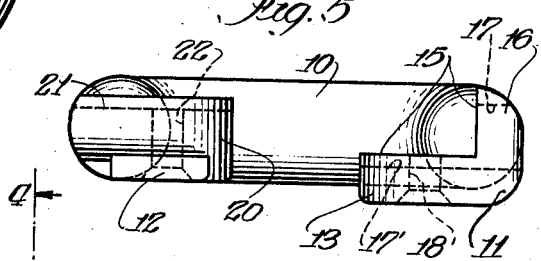
Figure 2:
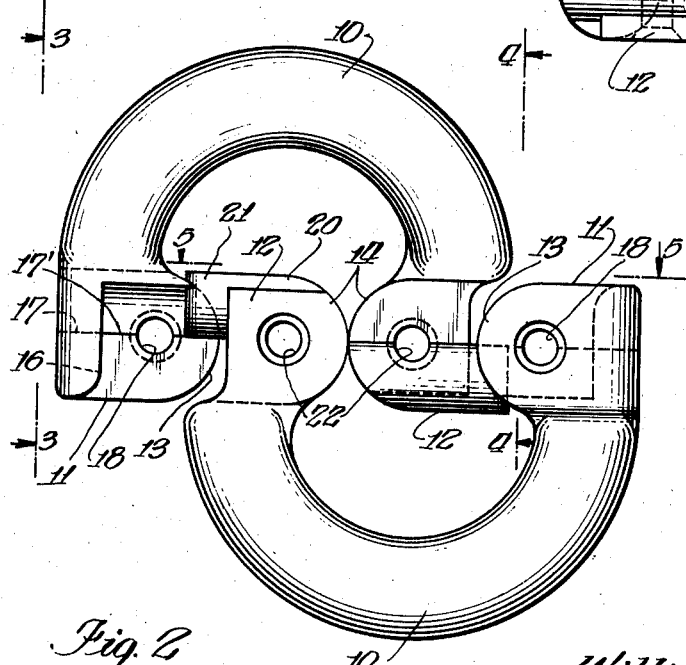
Figure 6:
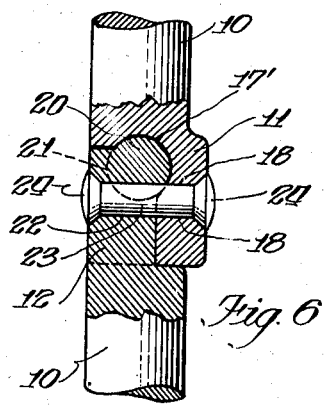

The invention will be best understood by reference to the accompanying drawing, forming a part of this specification and in which:

Fig. 1 is a side view of a repair link embodying the invention;

Fig. 2 a side view illustrating the parts of said link in positions for assembling the same;

Fig. 3 an edge view of one of the link parts;

Fig. 4 an edge view of the other side of said link part;

Fig. 5 a top plan view of one of the link parts;

Fig. 6 a section taken through one of the joints connecting the link parts.

The embodiment of the invention illustrated in the drawing comprises a repair link made in two substantially identical U-shaped halves 10, each half being provided with enlargements 11 and 12 at its ends as shown. The enlargements are provided at each end by means of inward bulges 13 and 14 on the inner edges of each of the link half ends and whereby sufficient metal may be provided in the link ends so that said link heads will have the same strength as the bodies of the link halves, notwithstanding certain perforations and distortions of the metal to be presently described.

Each link half 11 is provided with a socket 15 opening in one face and the inner edge of the link end, as best indicated in Figs. 3 and 5. The outer wall 16 of the socket 15 is provided with a cylindrical perforation 17 which is continued through the walls of said socket to form a rounded channel 17' as indicated, said perforation 17 and channel 17' being preferably formed by a drilling operation after the socket 15 has itself been formed by means of a forging operation. A rivet hole 18 is also provided in each link end 11 as indicated, said rivet hole being located as shown half way in the enlargement 13, and whereby sufficient metal is provided in the link half end so as to render the same substantially as strong as the body of the link half.

Each link end 12 is provided with a notch 19 in the face of the link opposite to that in which the socket 15 is formed and the other parts of the link end 12 are shaped to provide a rib 20 fitting the channel 17' and the cylindrical projection 21 fitting the perforation 17 so as to effect an interlocking connection between the link half ends when assembled, as indicated in Figs. 1 and 2, which contains sufficient metal to give the interlocking parts substantially the same longitudinal strength as is possessed by the body of the link halves without necessitating any enlargement or bulging of the outer edges of the link halves. The link ends 12 are also provided with rivet holes 22 registering with the rivet holes 18 and to receive securing rivets 23 having upset and countersunk heads 24 for securing said link ends to each other as is shown.

By this arrangement a repair link is provided, the interlocking parts of which may be readily constructed largely by forging operations and which may be readily fitted together in interlocking engagement when desired. The smooth outer edge of the contour of the link thus provided will permit the normal use of the chain without undue wear and without catching upon the guides or the like, thus adapting the repair link for use in chains on beef hoists, sheaves, pocketed wheels, or in similar uses, without interference or undue wear. The arrangement disclosed provides joints for the link halves which are well adapted to resist the lateral bending thereof or shearing of the rivets. The specific form and arrangement of parts constitutes a simple and efficient construction for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. A chain repair link comprising two link halves each having a socket formed in one of its ends opening in one face and the inner edge thereof, the outer wall of said socket having a perforation, the other end of each link half being notched in its face and shaped to form a head interlocking with the socket in the other link half and provided with a projection fitting said perforation; and means for securing said interlocked ends to each other.

2. A chain repair link comprising two substantially identical U-shaped link halves, each being inwardly bulged at each of its ends and having a socket formed in one of said ends opening in one face and the inner edge thereof, the outer wall of said socket having a perforation, the other end of each link half being notched in its face and shaped to form a head, interlocking with the socket in the other link half and provided with a projection fitting said perforation; and means for securing said interlocking ends to each other.

3. A chain repair link comprising two link halves, each having a socket formed in one of its ends opening in one face and the inner edge thereof, the other end of each link half being notched in its face and shaped to form a head interlocking with the socket in the other link half; and means for securing said interlocking ends to each other.

WILLIAM K. ROBBINS.